(12) United States Patent
Fukuhara

(10) Patent No.: US 8,189,244 B2
(45) Date of Patent: May 29, 2012

(54) CALIBRATION SYSTEM, CALIBRATING METHOD, AND CORRECTION PROCESSING PROGRAM

(75) Inventor: Takahiro Fukuhara, Yokosuka (JP)

(73) Assignee: Konica Minolta Business Technologies, Inc. (JP)

( * ) Notice: Subject to any disclaimer, the term of this patent is extended or adjusted under 35 U.S.C. 154(b) by 583 days.

(21) Appl. No.: 12/393,907

(22) Filed: Feb. 26, 2009

(65) Prior Publication Data

US 2009/0231644 A1    Sep. 17, 2009

(30) Foreign Application Priority Data

Mar. 12, 2008  (JP) ................................. 2008-063347

(51) Int. Cl.
*G03F 3/08* (2006.01)

(52) U.S. Cl. .................... 358/518; 358/504; 358/406

(58) Field of Classification Search .................. 358/406, 358/474, 504, 518, 523, 524, 1.9; 347/6, 347/14, 19
See application file for complete search history.

(56) References Cited

U.S. PATENT DOCUMENTS

| | | | | |
|---|---|---|---|---|
| 5,946,006 A | * | 8/1999 | Tajika et al. | 347/19 |
| 6,076,915 A | * | 6/2000 | Gast et al. | 347/19 |
| 6,204,873 B1 | * | 3/2001 | Shimazaki | 347/172 |
| 6,474,768 B1 | * | 11/2002 | Yano et al. | 347/19 |
| 6,494,557 B1 | * | 12/2002 | Kato et al. | 347/19 |
| 6,897,978 B1 | * | 5/2005 | Ohta | 358/1.9 |
| 2002/0048056 A1 | * | 4/2002 | Kubo | 358/518 |
| 2004/0141209 A1 | * | 7/2004 | Marumoto et al. | 358/3.26 |
| 2005/0248801 A1 | * | 11/2005 | Miyahara et al. | 358/1.14 |
| 2008/0130061 A1 | * | 6/2008 | Nakase et al. | 358/406 |
| 2009/0225358 A1 | * | 9/2009 | Tsuchida | 358/1.15 |

FOREIGN PATENT DOCUMENTS

| | | |
|---|---|---|
| JP | 2001-088357 | 4/2001 |
| JP | 2001-260407 | 9/2001 |

OTHER PUBLICATIONS

JPO Inquiry for appl. no. 2008-63347, mailed Jan. 28, 2011, 3 pgs.
Translation of JPO Inquiry for appl. no. 2008-63347, mailed Jan. 28, 2011, 3 pgs.
JPO Office Action for appl. no. 2008-063347, mailed Oct. 2, 2009, 2 pgs.
Translation of JPO Office Action for appl. no. 2008-063347, mailed Oct. 2, 2009, 2 pgs.

* cited by examiner

*Primary Examiner* — Kimberly A Williams
(74) *Attorney, Agent, or Firm* — Squire Sanders (US) LLP

(57) ABSTRACT

In a calibration system for conducting calibration by using a patch sheet produced on the basis of data to form measurement patches with respective different densities arranged in a predetermined direction and reference patches with a constant density arranged in the vicinity of the measurement patches for each color toner, the calibration system is provided with a correcting section to correct, on the basis of the calorimetric values of the reference patches, the calorimetric values of the measurement patches arranged in the vicinity of the reference patches.

8 Claims, 8 Drawing Sheets

CALIBRATION SYSTEM, CALIBRATING METHOD, AND CORRECTION PROCESSING PROGRAM

This application is based on Japanese Patent Application No. 2008-063347 filed on Mar. 12, 2008 in Japanese Patent Office, the entire content of which is hereby incorporated by reference.

BACKGROUND OF THE INVENTION

The present invention relates to a calibration system, calibrating method, and correction processing program for color correction.

Image forming apparatus equipped with a color printing function, such as a copying machine and a composite machine (MFP: Multi Function Peripheral), has been used widely. In this image forming apparatus, the following process is conducted: image information is generated based on print data transmitted from a host computer; an electrostatic latent image is formed on a photoreceptor that has been electrically charged by irradiating light based on the image information; the electrostatic latent image is developed into a toner image by the adhesion of electrically charged toner; and the toner image is transferred onto a sheet through an intermediate transfer member, such as a transfer roller and a transfer belt.

In the case of printing a color image, in order to reproduce the color displayed on a monitor of a host computer accurately, the host computer conducts color correction (referred to calibration) by the use of a color correction table. This color correction table can be produced with the following processes. Firstly, patterns (hereafter, referred to measurement patches) in which densities are changed for each color of toners of Yellow, Magenta, Cyan, and Black are printed. Secondly, the printed measurement patches are subjected to color measurement by a calorimetric device. Thirdly, the obtained calorimetric values are processed to produce the color correction table.

However, in an image forming apparatus to print the measurement patches, periodic density unevenness or accidental density unevenness may occur due to rotational unevenness of a photoreceptor or an intermediate transfer member. Therefore, at the time of printing a sheet (hereafter, referred to a patch sheet) on which the measurement patches are arranged in a predetermined direction, if such density unevenness occurs, the problem that the precision of a calibration gets worse, eventually arises.

Then, conventionally, a method has been used to suppress the influence of density unevenness by printing plural patch sheets, conducting color measurement for the printed plural patches, and calculating the average values of the calorimetric values.

Moreover, periodic density unevenness due to rotational unevenness of a photoreceptor or an intermediate transfer member is apt to take place in a direction vertical to a sheet feeding direction (that is, a belt-shaped density unevenness is apt to take place along a direction vertical to a sheet feeding direction). Then, a method has been used to suppress the influence of density unevenness by arranging measurement patches of each color in a sheet feeding direction (refer to Japanese Patent Unexamined Publication No. 2001-94803).

However, in the method of calculating the average values of the calorimetric values, since it is necessary to print plural patch sheets, there is a problem to consume sheets uneconomically. Moreover, when density unevenness occurred in the same position, even if the average values of the calorimetric values are calculated, the influence of the density unevenness cannot be suppressed. As a result, there is a problem that the precision of calibration gets worse.

Moreover, the method of Japanese Patent Unexamined Publication No. 2001-94803 merely avoid the bias of the periodic density unevenness to one color and does not perform correction for the occurred density unevenness. Therefore, there is a problem that the influence of the density unevenness appears on all the colors. Further, accidental density unevenness does not always occur in a direction vertical to a sheet feeding direction. Therefore, in the case that density unevenness occurs in a sheet feeding direction, all the measurement patches of a certain color may be printed thinly. As a result, there is a problem that the precision of calibration gets worse.

SUMMARY

The present invention has been achieved in view of the above-mentioned problems, and the objects of the present invention are to provide a calibration system, calibrating method, and correction processing program which can suppress the influence of density unevenness and can enhance the precision of calibration.

To achieve at least one of the abovementioned objects, a calibration system reflecting one aspect of the present invention has the following structures.

The calibration system is adapted to conduct calibration by using a patch sheet produced on the basis of data to form measurement patches arranged with respective different densities in a predetermined direction and reference patches arranged with a constant density in the vicinity of the measurement patches for each color toner, and the calibration system comprises:

a correcting section to correct, on the basis of a calorimetric value of a reference patch among the reference patches, a calorimetric value of a measurement patch arranged in the vicinity of the reference patch.

In the above calibration system, the correcting section calculates an amount of density deviation of each reference patch on the basis of the calorimetric value of each of the reference patches and the average value of the calorimetric values of all of the reference patches or a preset value, further calculates an amount of correction based on the amount of density deviation of the reference patch for the calorimetric value of the measurement patch arranged in the vicinity of the reference patch having the amount of density deviation exceeding a criterion value, and corrects the calorimetric value of the measurement patch on the basis of the amount of correction.

The above calibration system further comprises:
a host computer to instruct to output the patch sheet;
an image forming apparatus to output the patch sheet; and
a calorimetric section to measure the calorimetric value of each of the measurement patches and the calorimetric value of each of the reference patches on the patch sheet;
wherein the host computer comprises the correcting section and a calibrator to produce a color correction table based on the corrected calorimetric value of the measurement patch.

The above calibration system further comprises:
an image forming apparatus to output the patch sheet; and
a calorimetric section to measure the calorimetric value of each of the measurement patches and the calorimetric value of each of the reference patches on the patch sheet;

wherein the image forming apparatus comprises the correcting section and a calibrator to produce a color correction table based on the corrected calorimetric value of the measurement patch.

The above calibration system further comprises:

an image forming apparatus to output the patch sheet;

wherein the image forming apparatus comprises a calorimetric section to measure the calorimetric value of each of the measurement patches and the calorimetric value of each of the reference patches on the patch sheet; the correcting section and a calibrator to produce a color correction table based on the corrected calorimetric value of the measurement patch.

The above calibration system further comprises:

an image forming apparatus to form a toner image on the patch sheet;

wherein the image forming apparatus comprises a calorimetric section to measure the calorimetric value of each of the measurement patches and the calorimetric value of each of the reference patches by the use of the toner image on the patch sheet transferred onto an intermediate transfer member; the correcting section and a calibrator to produce a color correction table based on the corrected calorimetric value of the measurement patch.

DETAILED DESCRIPTION OF THE PREFERRED EMBODIMENT

Hereafter, preferable embodiments of the present invention will be explained with reference to drawing. However, the present invention is not limited to these preferable embodiments.

As a preferable embodiment of the present invention, in a calibration system to conduct a calibration by using a patch sheet, an image forming apparatus outputs a patch sheet on the basis of data to form measurement patches arranged in a predetermined direction with respectively changed different densities and reference patches arranged in the vicinity of corresponding measurement patches with a predetermined density for each color of toners. The image forming apparatus or a calorimetric device conducts color measurement (colorimetry) for the measurement patches and the reference patches on the patch sheet and notifies the calorimetric values to a host computer or the image forming apparatus. A density unevenness correcting section provided in the host computer or the image forming apparatus detects density unevenness in the patch sheet based on the calorimetric values of the reference patches, calculates the position and the amount of density deviation of a reference patch on which density unevenness occurs, and corrects based on the calculated amount of density deviation the calorimetric values of a measurement patch arranged near the reference patch on which the density unevenness occurs. And then, a calibrator provided in the host computer or the image forming apparatus processes the corrected calorimetric values of the measurement patch with a conventional calibration method and produces a color correction table.

Example

Figure 1:
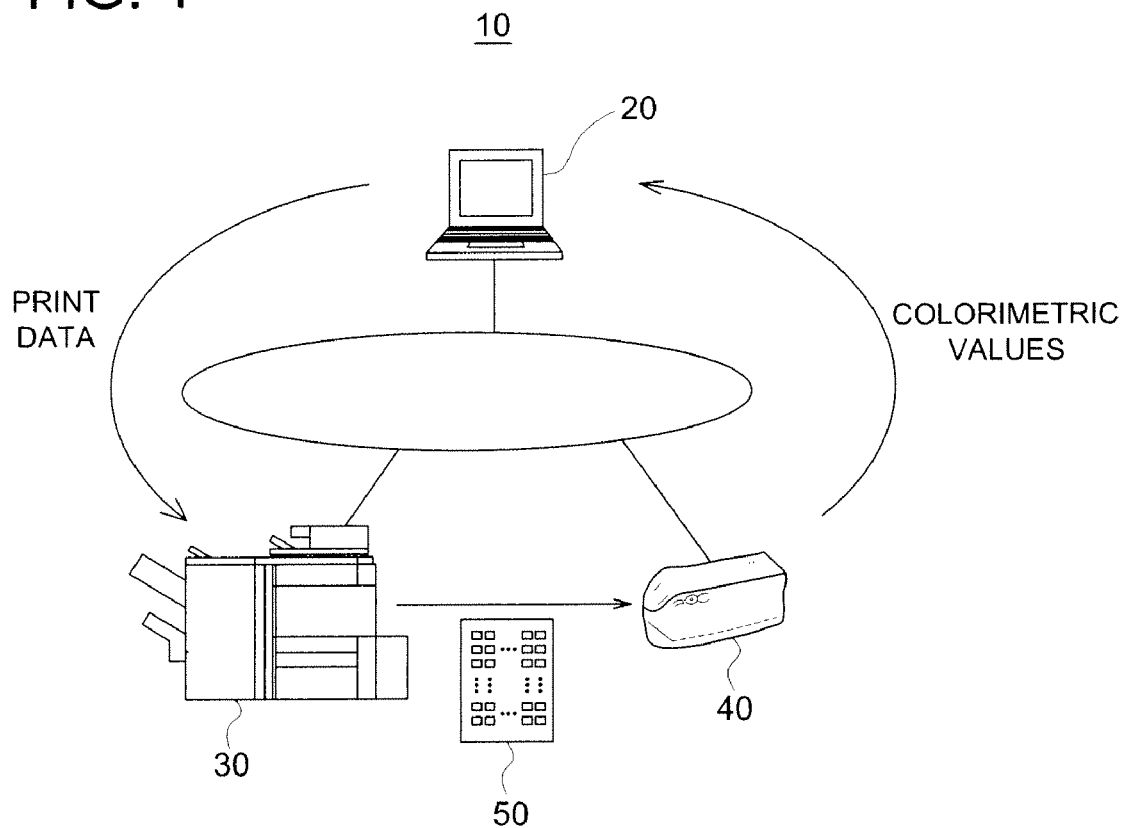
FIG. 1 is a schematic illustration showing a configuration of a calibration system according to one embodiment of the present invention.
Figure 2:
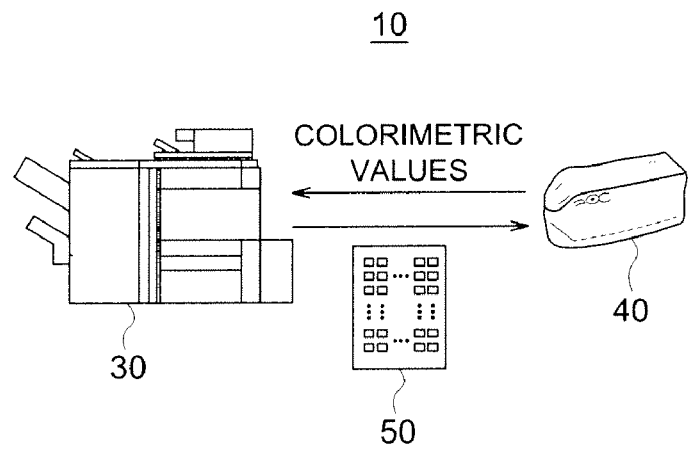
FIG. 2 is a schematic illustration showing another configuration of a calibration system according to one embodiment of the present invention.
Figure 3:
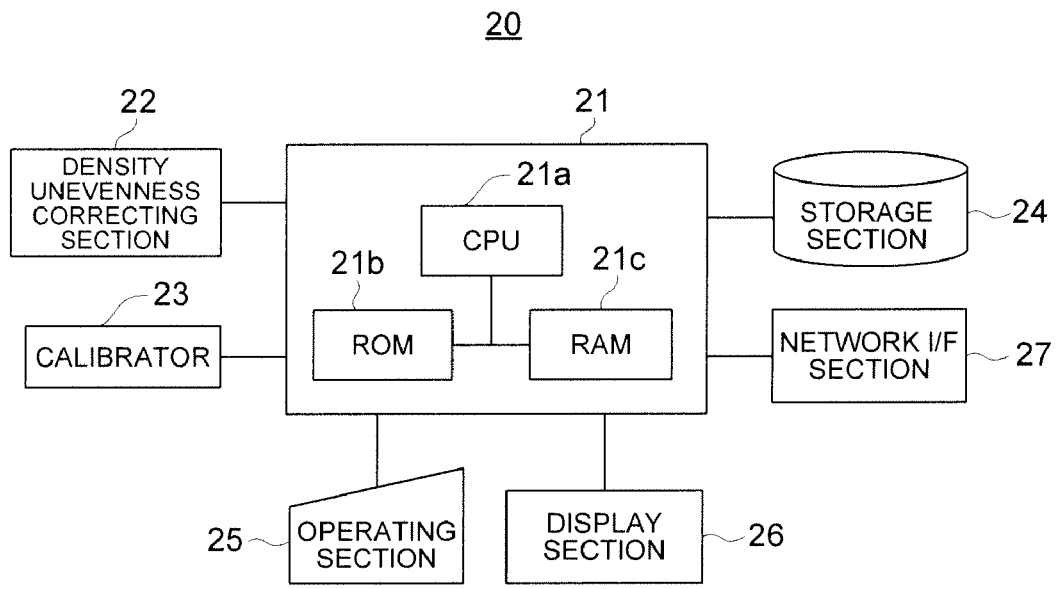
FIG. 3 is a block diagram showing a structure of a host computer according to one embodiment of the present invention.
Figure 4:
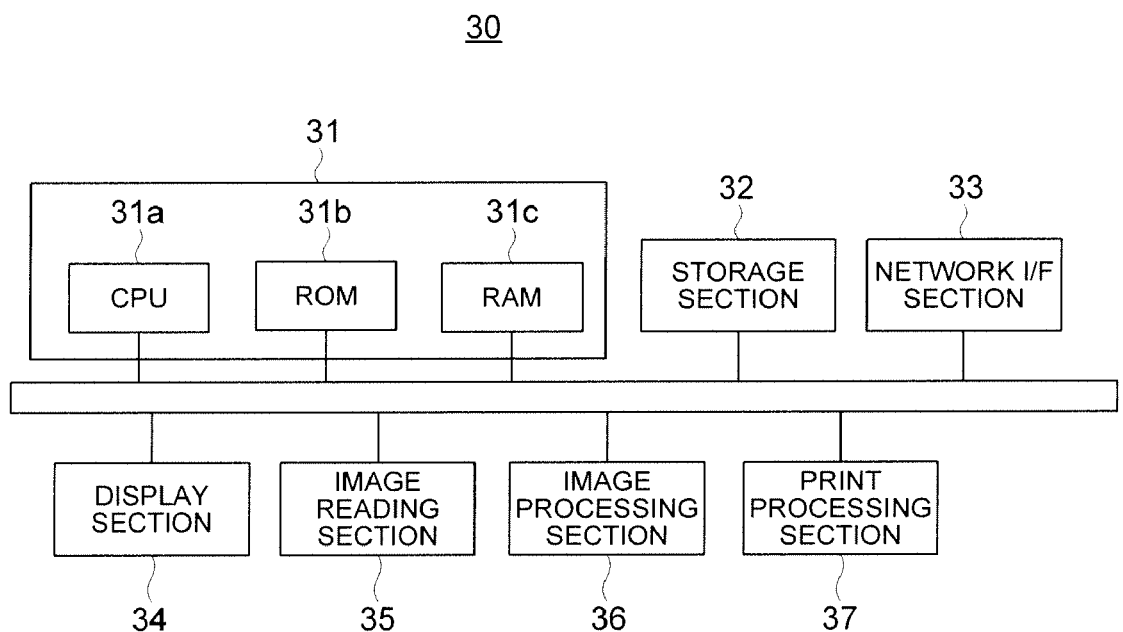
FIG. 4 is a block diagram showing a structure of an image forming apparatus according to one embodiment of the present invention.
Figure 5:
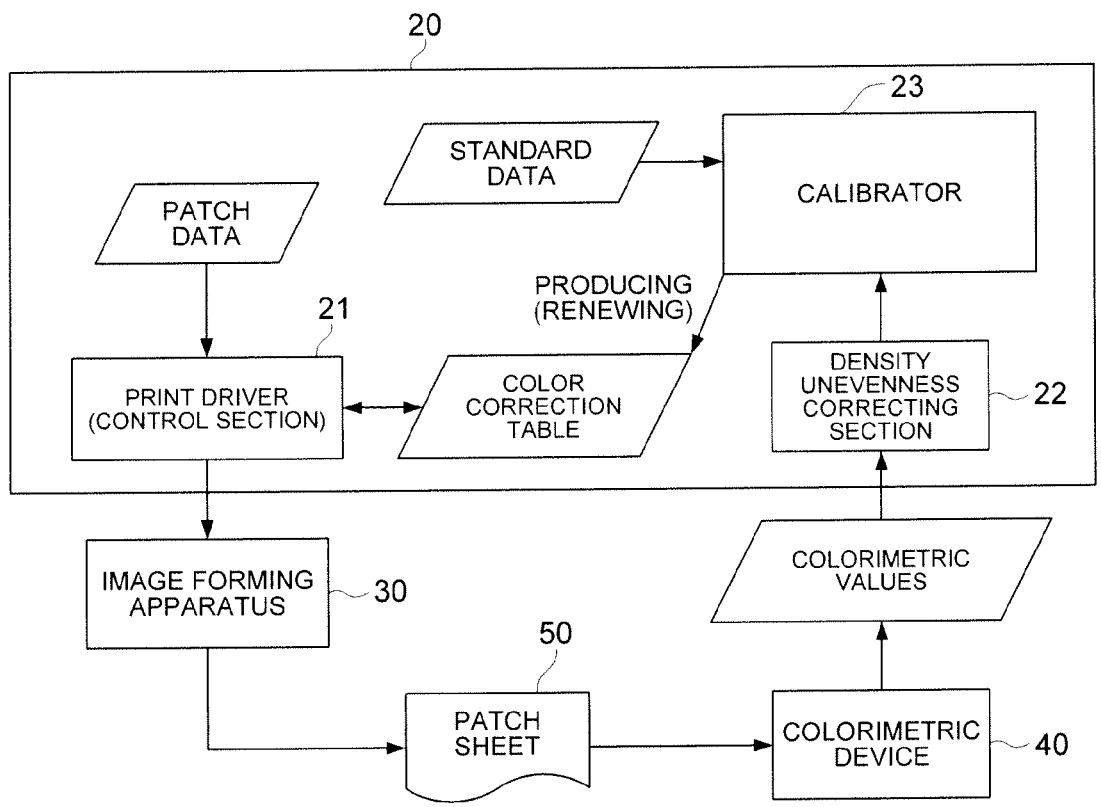
FIG. 5 is a diagram showing outline operations of the calibration system according to one embodiment of the present invention.
Figure 6:
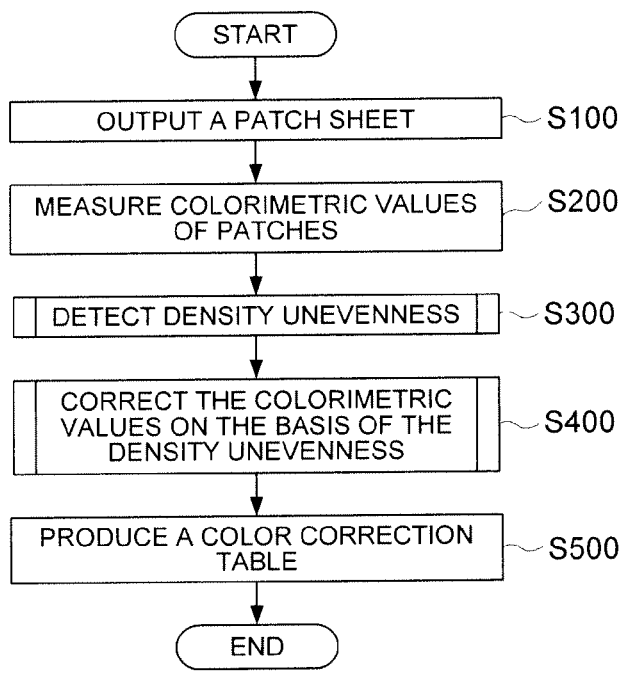
FIG. 6 is a flow chart showing procedures of a calibrating method according to one embodiment of the present invention.
Figure 7:
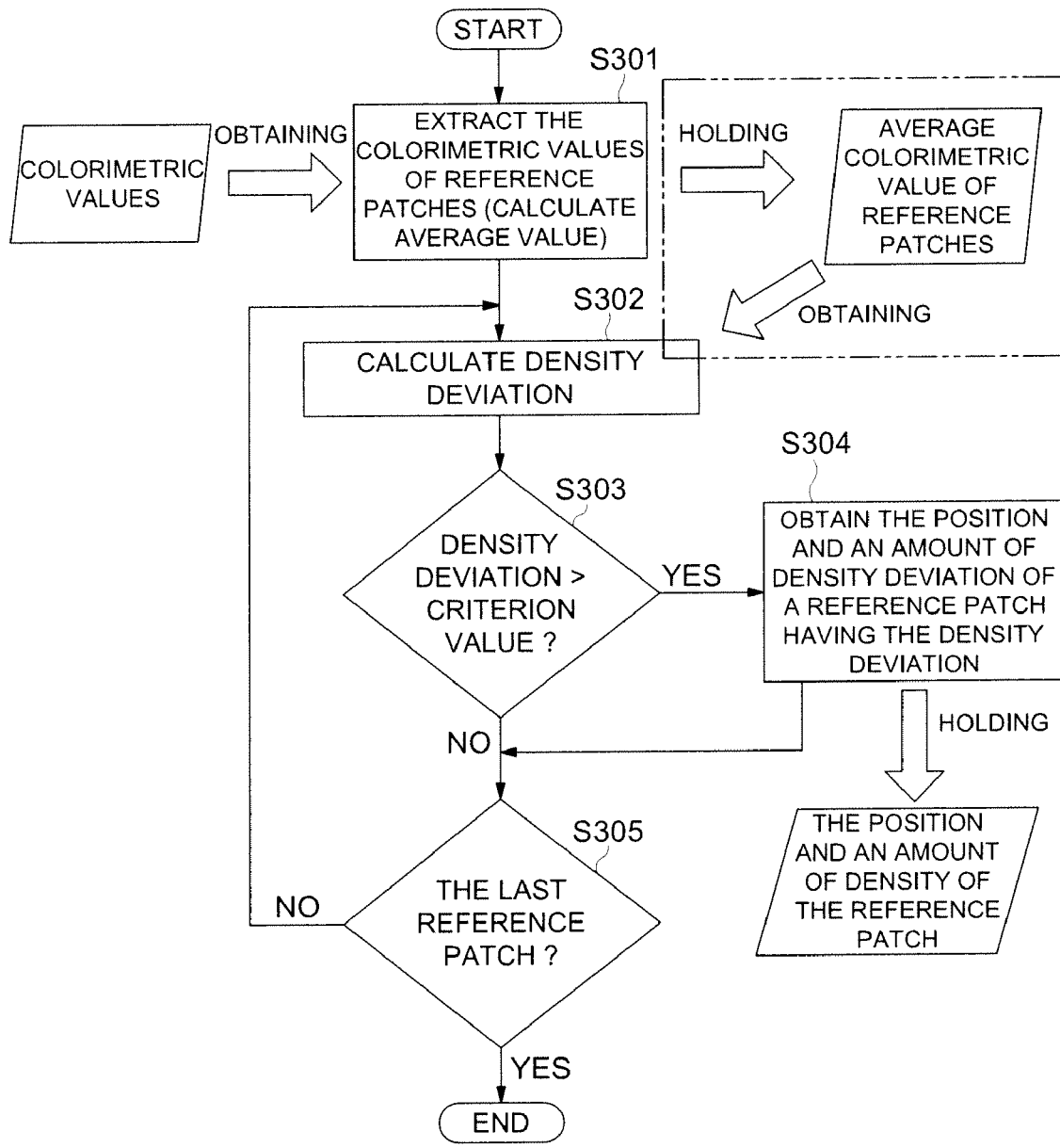
FIG. 7 is a flow chart showing detection procedures for density unevenness by the calibrating method according to one embodiment of the present invention.
Figure 8:
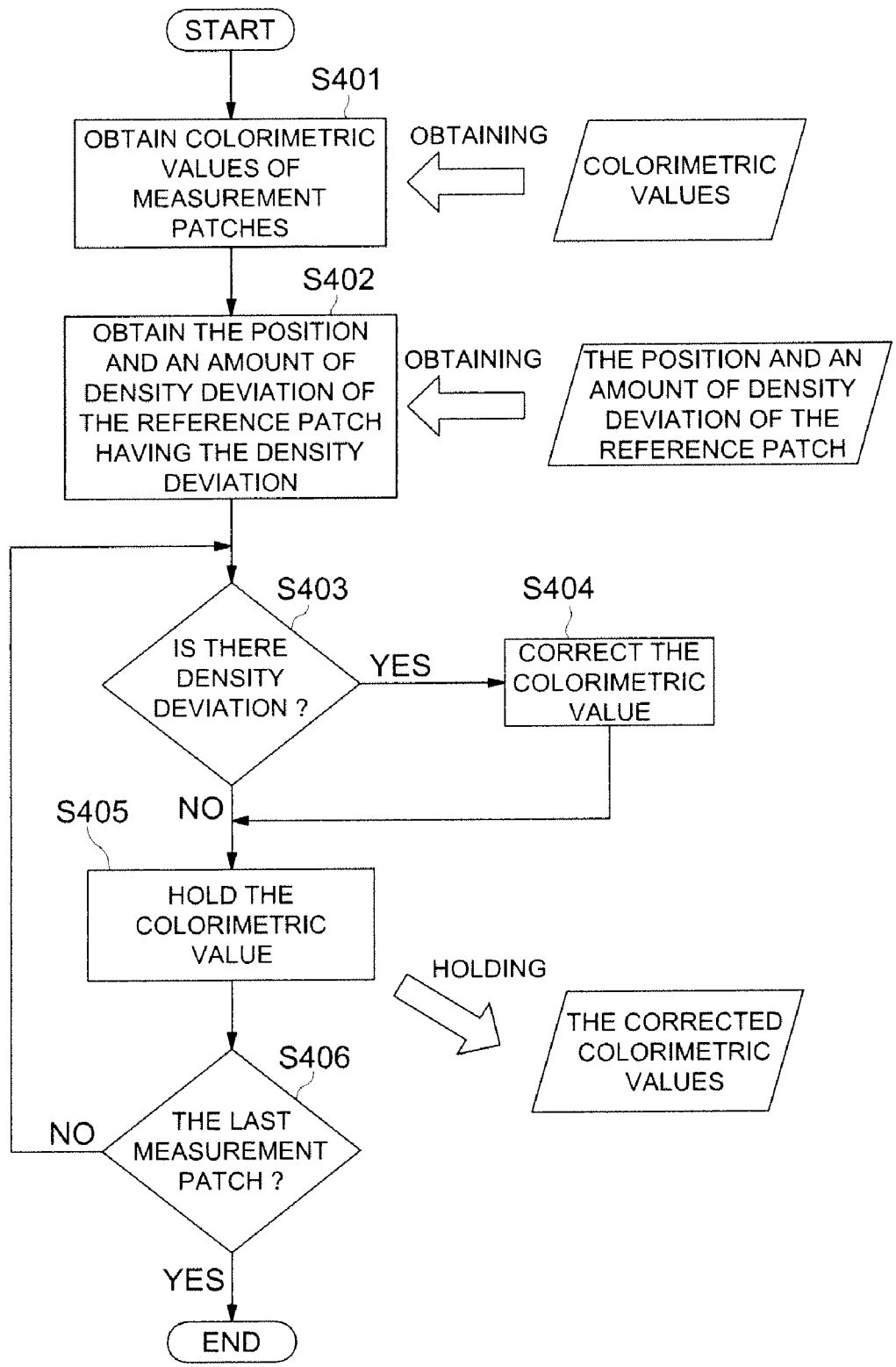
FIG. 8 is a flow chart showing correcting procedures for calorimetric values of the calibrating method according to one embodiment of the present invention.

In order to explain in detail about the above-mentioned embodiment of the present invention, the calibration system, calibrating method, and correction processing program according to one example of the present invention are explained with reference to FIGS. 1 through 15. FIGS. 1 and 2 each is a schematic illustration showing the structure of the calibration system of this example. Further, FIG. 3 is a block diagram showing the structure of a host computer, and FIG. 4 is a block diagram showing the structure of an image forming apparatus, and FIG. 5 is an illustration showing an outline operation of the calibration system. Moreover, FIGS. 6 through 8 are flow chart diagrams showing the procedure of the calibration of this example, and FIGS. 9 through 15 are illustrations showing the structural example of patch sheets of this example.

As shown in FIG. 1, a calibration system 10 of this example comprises one or plural client apparatuses (hereafter, referred to a host computer 20) to instruct to output a patch sheet 50, one or plural image forming apparatus 30 to output the patch sheet 50 based on the instruction from the host computer 20, and a calorimetric device 40 to conduct color measurement for the patch sheet 50. These apparatus and devices are connected to each other through communication networks, such as LAN (Local Area Network) and WAN (Wide Area Network). Hereafter, each of apparatus and devices is explained in full detail.

[Host Computer]

As shown in FIG. 3, the host computer 20 comprises a control section 21, a density unevenness correcting section 22, a calibrator 23, a storage section 24, an operating section 25, a display section 26, a network I/F section 27, and the like.

The control section 21 is constituted by a CPU (Central Processing Unit) 21a, a ROM (Read Only Memory) 21b, a RAM (Random Access Memory) 21c, and the like. The CPU 21a reads a printer driver being software for controlling the image forming apparatus 30 from the ROM 21b or the storage section 24, and develops and executes it in the RAM 21c.

The density unevenness correcting section 22 detects density unevenness in a patch sheet 50 based on the calorimetric values of reference patches obtained by the color measurement conducted by the calorimetric device 40, and corrects the calorimetric values of measurement patches measured by the calorimetric device 40 based on the detected density unevenness.

The calibrator 23 compares the corrected calorimetric values of the measurement patches with reference data, and produces a color correction table.

The storage section 24 is constituted by a HDD (Hard Disk Drive) and the like, and memorizes a program and data. In this example, the storage section 24 memorizes print data (referred to patch data) to print a patch sheet 50, standard data (data indicating densities to be actually outputted for each of gradation values of an image), a color correction table (storing data of information for conducting correction in accordance with the density characteristics of the image forming apparatus 30 in order to print with the density specified with standard data), and the like.

The operating section 25 is constituted by a keyboard, a mouse, and the like, and enables operations, such as an output instruction of a patch sheet 50.

The display section 26 is constituted by a LCD (Liquid Crystal Display) and the like, and displays a printer driver setting screen for setting up various items with regard to printing (especially, output instruction of a patch sheet 50), and the like.

The network I/F section 27 is constituted by a NIC (Network Interface Card), a modem, and the like, and enables communication with the image forming apparatus 30.

Here, the density unevenness correcting section 22 can be constituted as hardware, or as a correction processing program to make a computer to act as the density unevenness correcting section 22, and this correction processing program can be adapted to work on the control section 21.

[Image Forming Apparatus]

As shown in FIG. 4, the image forming apparatus 30 is constituted by a control section 31, a storage section 32, a network I/F section 33, a display operating section 34, an image reading section 35, an image processing section 36, a print processing section 37, and the like, and these sections are connected to each other through a bus.

The control section 31 is constituted by a CPU 31a, a ROM 31b, a RAM 31c, and the like, and the CPU 31a reads out various programs from the ROM 31b or the storage section 32, and develops and performs them in the RAM 31c.

The storage section 32 is constituted by a HDD and the like and memorizes programs to control the operations of the image forming apparatus 30, print data obtained from the host computer 20, and an image of a patch sheet 50, a color correction table and the like if needed.

The network I/F section 33 is constituted by a NIC, a modem, and the like, and enables communication with the host computer 20. In this example, the network I/F section 33 receives print data and the like from the host computer 20.

The display operating section 34 is constituted by a display section, such as an LCD and an operating section, such as a touch panel covering the display section, display an icon, a key button, and the like on the LCD in accordance with indication signals from the CPU 31a, and outputs operation signal inputted from the touch panel to the CPU 31a. Here, the display operating section 34 can be constituted in one body, or can be constituted to separate into a display section and an operating section.

The image reading section 35 is constituted by a light source to scan document sheets, sensors to detects each color, such as CCD (Charge Coupled Devices) image sensors to convert light reflected from the document sheets into electrical signals, an A/D converter to conduct an A/D conversion for the electrical signals so as to produce image data, and the like. This image reading section 35 functions as a calorimetric section in the case that the color measurement for a patch sheet 50 is conducted on the image forming apparatus 30.

The image processing section 36 analyzes print data obtained from the host computer 20, and produces image data with a bitmap format (an image of a patch sheet 50 in this example).

The print processing section 37 forms images in accordance with an electrophotographic process based on image data produced by the image processing section 36 and transfers the images onto a sheet so as to produce a patch sheet 50. Concretely, the print processing section 37 conducts processes of irradiating light according to image data on a uniformly charged photoreceptor drum so as to form electrostatic latent images, visualizing the above electrostatic latent images by adhering charged toner onto them so as to form toner images, transferring the toner images onto a sheet through intermediate transfer members, such as a primary transfer roller and a secondary transfer belt, and then fixing the toner images onto a sheet by heating and pressing them.

Here, in the present example, the image processing section 36 is provided in the image forming apparatus 30. However, the processing of the image processing section 36 can be conducted by a RIP (Raster Image Processor) controller connected to a network. In this case, the RIP controller analyzes print data and produces images (bitmap images) of a patch sheet 50 and transmits the images to the image forming apparatus 30.

[Colorimetric Device]

The calorimetric device 40 is constituted by a calorimetric section, a network I/F section (not shown), and the like.

The calorimetric section is equipped with, for example, three kinds of sensors corresponding to the three primary colors of Red, Green, and Blue light, conducts a color measurement based on output values (RGB values) from the three kinds of sensors for each part of color images, and converts the color measurement result into L*a*b* data as calorimetric values.

Here, employable examples of the calorimetric device 40 include a calorimeter (for example, hue color-difference meter CR-400 manufactured by Konica Minolta Sensing, Inc.) adopting a stimulus value reading method, and a spectrocolorimetric meter (for example, spectrocolorimetric meter CM-200d manufactured by Konica Minolta Sensing, Inc.) adopting a spectrophotometric colorimetry.

The network I/F section is constituted by a NIC, a modem, and the like, and enables communication with the host computer 20. In this example, network I/F section transmits calorimetric values of each patch to the host computer 20.

[Patch Sheet]

Figure 9:
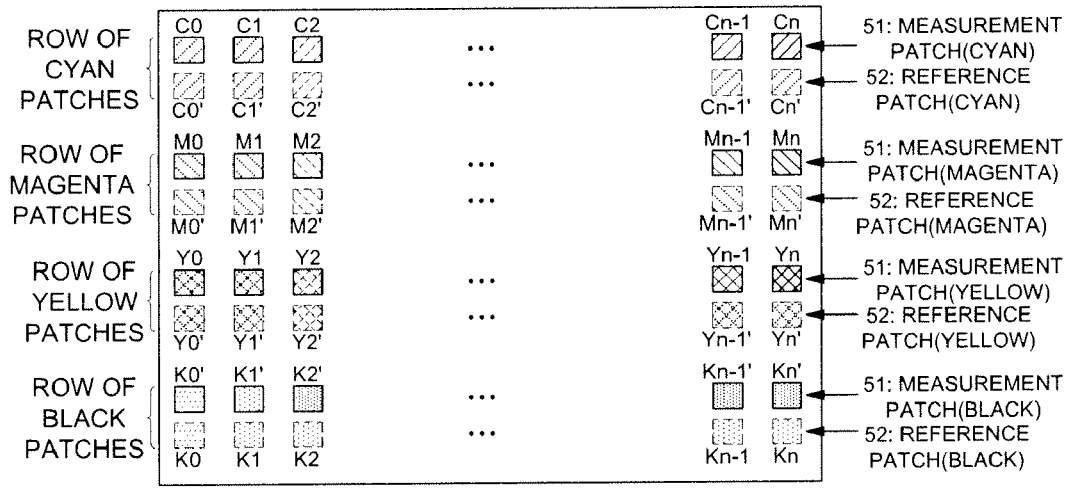
FIG. 9 is an illustration showing a structural example of a patch sheet according to one embodiment of the present invention.

As shown in FIG. 9, the patch sheet 50 is provided with measurement patches 51 (with a frame of a solid line) and reference patches 52 (with a frame of a dashed line) for each color (here, the kind of hatching is changed so as to express the difference of colors) of toners of Yellow, Magenta, Cyan, and Black. The measurement patches 51 of respective colors are ideally arranged in such a way that the densities of the respective colors change gradually along a predetermined direction (for example, a sheet feeding direction or a direction perpendicular to the sheet feeding direction). Moreover, the reference patches 52 are arranged in the vicinity of the measurement patches 51 of the respective colors, and are printed with the same color as the corresponding measurement patch 51 and ideally with a predetermined constant density (for example, density of 50%). Here, the reason why the term "ideally" is described is that the measurement patches 51 and the reference patches 52 may be actually printed with densities different from predetermined densities under the environmental influence due to the mechanism of an image forming apparatus.

The gap between the measurement patches 51 and the reference patches 52 can be suitably set up in accordance with the characteristics of the image forming apparatus 30 and the required precision of the calibration. Further, the above gap can also be changed according to the arranging direction of the patches. For example, in the case of supposing periodic density unevenness to take place in the form of belt due to rotational unevenness of a photoreceptor or an intermediate transfer member, with regard to a direction along which such a belt-like density unevenness tends to occur (in other words, the longitudinal direction of the belt-like density unevenness or usually the direction perpendicular to a sheet feeding direction), since there is substantially no density change in this direction, the gap between the measurement patches 51 and the reference patches 52 can be made larger. On the other hand, with regard to a direction along which such a belt-like density unevenness hardly occur (in other words, a direction perpendicular to the longitudinal direction of the belt-like density unevenness or usually a sheet feeding direction), since there is a possibility to cause remarkable density change in this direction, the gap between the measurement patches 51 and the reference patches 52 can be made smaller as far as possible or may not be provided. Namely, the description that the reference patches 52 are arranged in the vicinity of the measurement patches 51 means the positional relationship selectable suitably as long as the calorimetric values of the measurement patches 51 can be corrected based on the calorimetric values of the reference patches 52.

Figure 10:
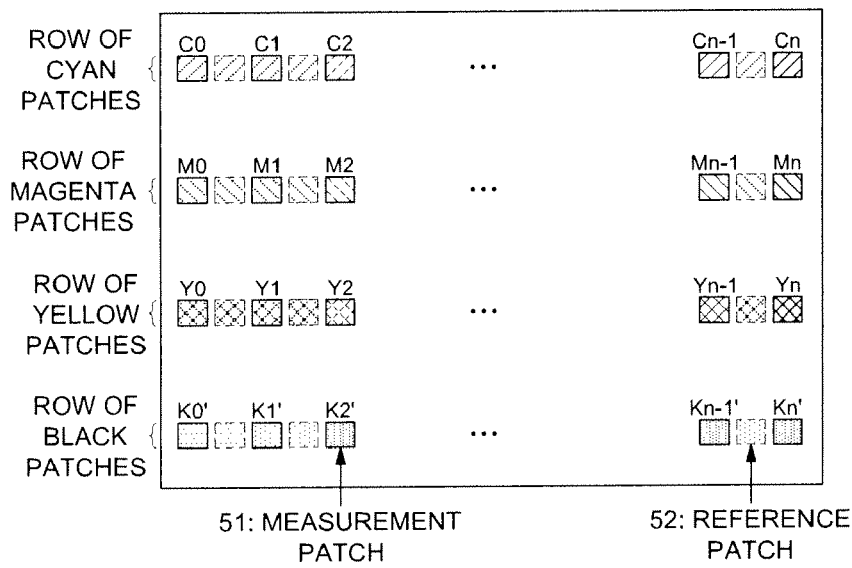
FIG. 10 is an illustration showing another structural example of a patch sheet according to one embodiment of the present invention.
Figure 11:
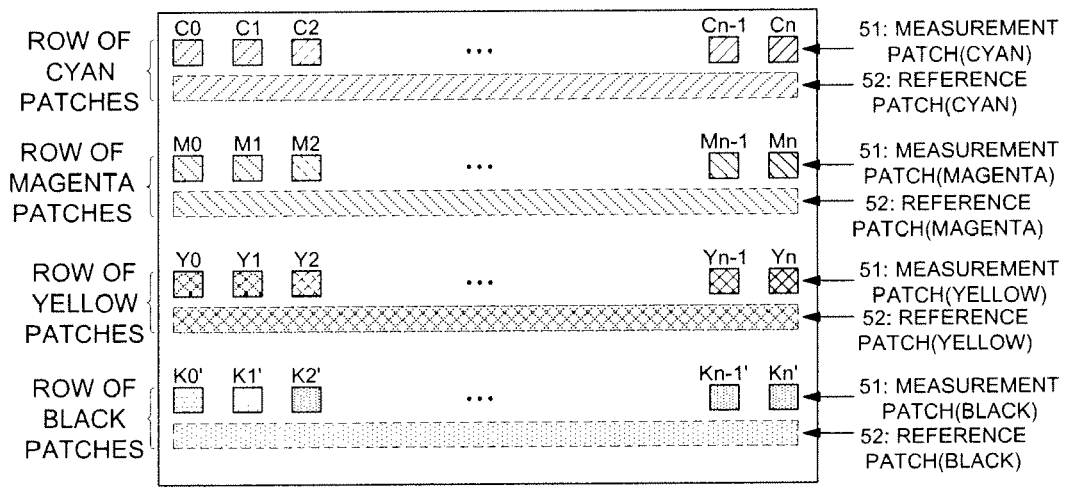
FIG. 11 is an illustration showing another structural example of a patch sheet according to one embodiment of the present invention.
Figure 12:
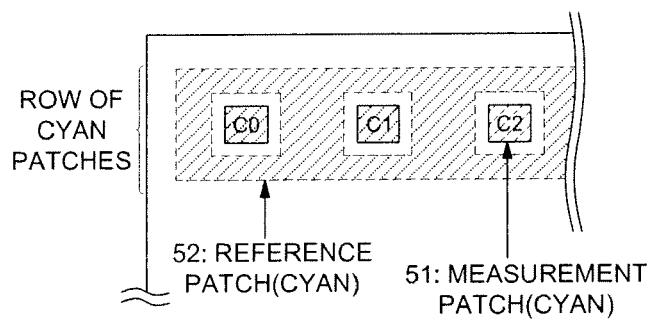
FIG. 12 is an illustration showing another structural example of a patch sheet according to one embodiment of the present invention.
Figure 13:
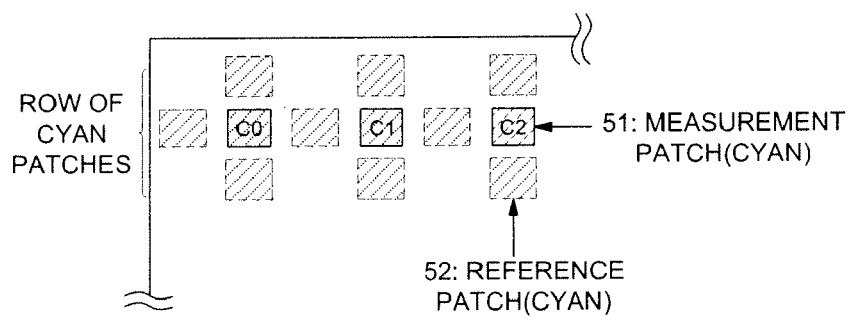
FIG. 13 is an illustration showing another structural example of a patch sheet according to one embodiment of the present invention.

Here, it is not necessary to arrange the measurement patches 51 and the reference patches 52 with a relation of one to one. For example, the reference patches 52 can be arranged between the measurement patches 51 as shown in FIG. 10. Further, as shown in FIG. 11, the reference patches 52 can be formed continuously in the form of a belt. Still further, as shown in FIG. 12, the reference patches 52 can be arranged to surround the measurement patches 51. Moreover, as shown in FIG. 13, plural reference patches 52 can be arranged to one measurement patch 51, or one reference patch 52 can be arranged to plural measurement patches 51. Especially, the examples shown in FIG. 12 and FIG. 13 are preferable, because measurement values can be corrected with a sufficient precision regardless of the shape in which density unevenness is shaped such as belt and spots or regardless of the direction in which the longitudinal direction of the belt-like density unevenness is formed.

Figure 14:
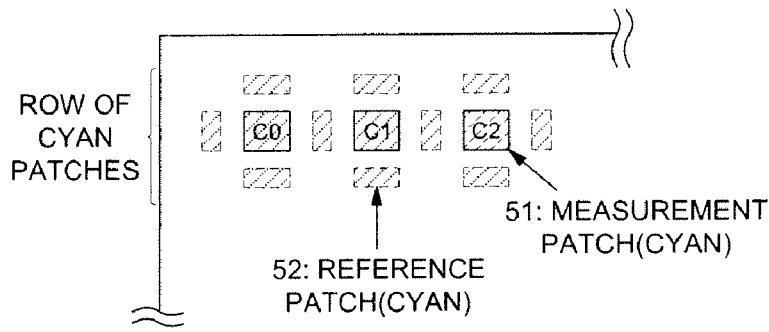
FIG. 14 is an illustration showing another structural example of a patch sheet according to one embodiment of the present invention.
Figure 15:
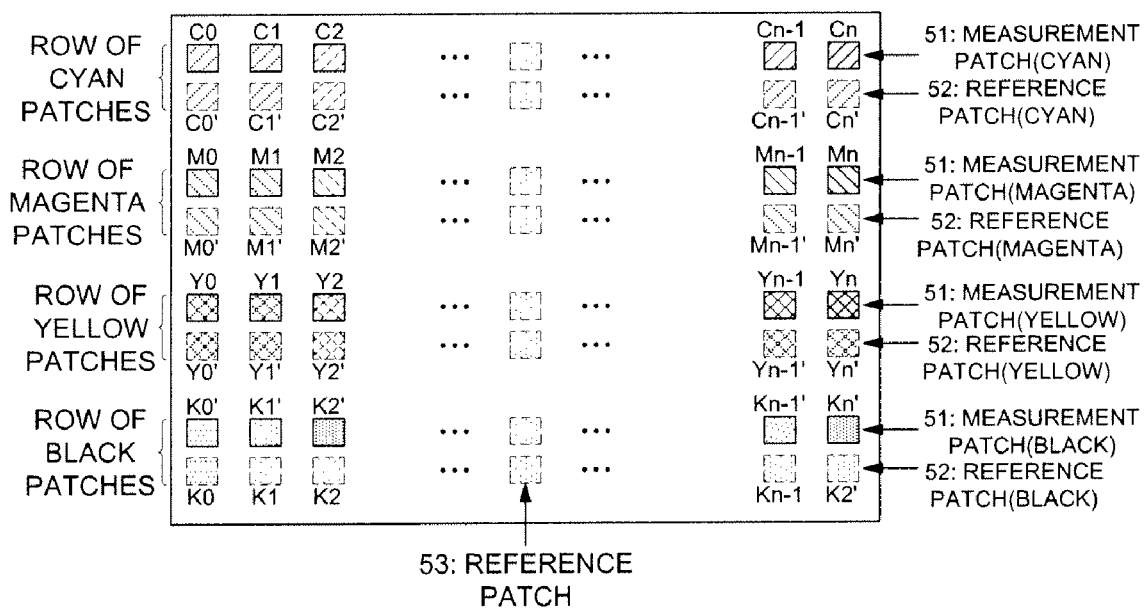
FIG. 15 is an illustration showing another structural example of a patch sheet according to one embodiment of the present invention.

Moreover, the shape of the measurement patches 51 can be different from that of the reference patches 52. For example, as shown in FIG. 14, the reference patch 52 can be made small, and the gap of the measurement patches 51 can be made narrow.

Furthermore, in addition to the reference patch 52 arranged in the arranging direction of the measurement patches 51, another reference patch 53 (the color is arbitrary) can be arranged in the direction perpendicular to the arranging direction of the measurement patches 51.

As mentioned above, the basic constitution of the calibration system 10 of this example is shown hereto. However, as shown in FIG. 2, the calibration system 10 can be constituted by an image forming apparatus 30 and a calorimetric device 40. In that case, a color correction table is memorized in the storage section 32 of the image forming apparatus 30, and a density unevenness correcting section and a calibrator can be provided in the image forming apparatus 30.

Further, the color measurement for patches can also be conducted by the image reading section 35 of the image forming apparatus 30. In this case, the calorimetric device 40 can be omitted and the calibration system 10 can be constituted by only the image forming apparatus 30.

Furthermore, a sensor to reads images on a patch sheet 50 transferred onto an intermediate transfer member can be arranged to the print processing section 37, and the print processing section 37 can be adapted to act as a calorimetric section. With this structure, since it is not necessary to print a patch sheet 50, the calibration can be performed quickly and sheets can be saved.

Moreover, in the constitution of FIGS. 1 and 2, the calorimetric device 40 can be adapted to conduct the color measurement for the measurement patches 51, and the image reading section 35 or the print processing section 37 of the image forming apparatus 30 can be adapted to conduct the color measurement for the reference patches 52. Therefore, the both sides of the calorimetric device 40 and the image forming apparatus 30 can be adapted to act as the calorimetric section.

Hereafter, a calibrating method using the calibration system 10 having the above-mentioned structure will be explained with reference to the schematic operation diagram of FIG. 5 and the flow chart diagram of FIG. 6. Here, the calibrating method is explained hereafter based on the structure shown in FIG. 1.

First, when the operating section 23 of the host computer 20 is operated so as to instruct to output a patch sheet 50, the control section 21 (printer driver) reads out a patch data stored beforehand in the storage section 24, and transmits the patch data to the image forming apparatus 30.

Next, at Step S100, the image processing section 36 of the image forming apparatus 30 analyzes the patch data and forms an image of a patch sheet 50, and the print processing section 37 transfers the image onto a sheet to form a patch sheet 50 and outputs the patch sheet 50. As mentioned above, this patch sheet 50 includes measurement patches 51 and reference patches 52. The measurement patches 51 are monochromatic (C, M, Y, K) gradation patches whose densities are varied gradually with increments and decrements, and the reference patches 52 are a monochromatic (C, M, Y, K) halftone patch.

Next, at Step S200, when the outputted patch sheet 50 is set to the calorimetric device 40, the calorimetric device 40 scans the patch sheet 50, and conducts color measurement for the measurement patches 51 and the reference patches 52 of each color. And then, the obtained calorimetric values are transmitted to the host computer 20. Here, if the arrangement pattern of patches and the data size and data arrangement order of the calorimetric values of each patch are known, the host computer 20 can recognize the calorimetric values of each measurement patch 51, the calorimetric values of each reference patch 52 and the positional relationship between both.

Next, at Step S300, the density unevenness correcting section 22 of the host computer 20 detects density unevenness in the patch sheet 50 based on the calorimetric values of the reference patches 52 (the details will be described later). The detection of this density unevenness has an object to obtain the position and the extent (the amount of density deviation) of the density unevenness of a reference patch 52 in which the density unevenness occurred.

Next, at Step S400, from the arrangement pattern of patches, the data size and arrangement order of the calorimetric values, and the like, the density unevenness correcting section 22 specifies a measurement patch 51 near the reference patch 52 in which the density unevenness occurred and corrects the calorimetric value of the specified measurement patch 51 (the details will be described later).

Next, at Step S500, the calibrator 23 compares the corrected calorimetric value of the measurement patch 51 with standard data, produces a color correction table by using a well-known technique, and stores the produced color correction table in the storage section 24.

Then, at the time of instructing printing documents and the like, the control section 21 (printer driver) of the host computer 20 conducts color correction for the data of the documents with reference to the color correction table stored in the storage section 24, and then converts the corrected data into print data and transmits the print data to the image forming apparatus 30.

Next, the procedure (Step S300) of detecting density unevenness by the density unevenness correcting section 22 will be explained in detail with reference to the flow chart of FIG. 7.

First, at Step S301, the calorimetric values of the reference patches 52 are extracted from the calorimetric values obtained from the calorimetric device 40. Moreover, when the average of the calorimetric values is used for calculation of the amount of density deviation, the average calorimetric value of the reference patches 52 is calculated (refer to the inside of the area enclosed with one doted chain line in FIG. 7).

Next, at Step S302, an amount of density deviation is calculated for the calorimetric value of each of the reference patches 52. This amount of density deviation can be made as the difference (refer to Formula 1) between the calorimetric value of a reference patch 52 in which the density unevenness occurred and the average calorimetric value of all the reference patches 52, or the difference (refer to Formula 2) between the calorimetric value of a reference patch 52 and a setting density (for example, 50%).

Amount of density deviation=(calorimetric value of a reference patch)−(average calorimetric value of all reference patches)  (Formula 1)

Amount of density deviation=(calorimetric value of a reference patch)−(setting density(50%))  (Formula 2)

Next, at Step S303, whether or not the calculated amount of density deviations is over a criterion value set up beforehand, is judged. In the case that the calculated amount is over the criterion value, it is judged that there is density unevenness.

When it is judged that there is density unevenness, and the position and the amount of density deviation of the reference patch 52 are obtained at Step S304, and the position and the amount of density deviation of the reference patch 52 are held in the storage section 24. The position of this reference patch 52 can be made as a printing position of the reference patch 52 on the patch sheet 50, or can be made as a position (offset value) of the reference patch 52 in the calorimetric value data. The position of this reference patch 52 is obtained in order to specify the calorimetric value of a measurement patch 51 located near that reference patch 52.

Thereafter, at Step S305, whether or not a current reference patch 52 is the last reference patch 52, is judged. In the case that there is another reference patches 52, the procedure is returned to Step S302 and the same processing is repeated.

Next, the procedure (Step S400) to correct calorimetric values by the density unevenness correcting section 22 is explained in detail with reference to the flow chart diagram of FIG. 8.

First, at Step S401, the calorimetric value of a measurement patch 51 are obtained from the calorimetric values obtained from the calorimetric device 40.

Next, at Step S402, the position and the amount of density deviation of the reference patch 52 in which the density deviation occurred are obtained from the storage section 24 and the like.

Next, at Step S403, whether or not the measurement patch 51 is influenced by density unevenness, is judged from the arrangement pattern of patches, the obtained position and amount of density deviation of the reference patch 52. Concretely, in the case that there is a density deviation in a reference patch 52 near a measurement patch 51, it is judged that the measurement patch 51 is influenced by density unevenness. Besides, also in the case that there is a density deviation in a reference patch 52 near a measurement patch 51 neighboring the measurement patch 51, it can be judged that the measurement patch 51 is influenced by density unevenness.

And, in the case that the measurement patch 51 is influenced by density unevenness, the calorimetric value of the measurement patch 51 is corrected at Step S404. For example, an amount of correction is calculated from a setting density of the measurement patch 51 and the average density and an amount of density deviation of the reference patch 52. Concretely, since the obtained amount of density deviation is a value in the case that the density of the reference patch 52 is 50%, the obtained amount of density deviation is not applicable to the correction for the calorimetric values of measurement patches 51 other than 50%, if the obtained amount of density deviation remains as it is. Then, it is considered that the amount of density deviation of the measurement patch 51 due to density unevenness is proportional to density. That is, in the case that the density of the reference patch (density: 50%) has deviated by 2%, an amount of correction is calculated on the assumption that the deviation becomes 1% in the reference path (density: 25%) and the deviation becomes 4% in the reference path (density: 100%), (refer to Formula 3), and this amount of correction is subtracted from the calorimetric values of the measurement patch 51 (refer to Formula 4).

Amount of correction=(setting density of a measurement patch)/(setting density of a reference patch)×density deviation  (Formula 3)

Corrected calorimetric value of the measurement patch after correction=(calorimetric value of a measurement patch)−(amount of correction)  (Formula 4)

Next, at Step S405, for a measurement patch 51 which is judged such that there is no density unevenness, the calorimetric values of the measurement patch 51 are stored in the storage section 24 as they are. On the other hand, for a measurement patch 51 which is judged such that there is density unevenness, the corrected calorimetric values of the measurement patch 51 are stored in the storage section 24.

Next, at Step S406, whether a current measurement patch 51 is the last measurement patch 51 is judged. Then, when it is judged that there are other measurement patches 51, the procedure is returned to Step S403, and the same processing is repeated.

Here, the above-mentioned flow shows the procedure in the case that the calorimetric values of the measurement patch 51 are corrected in the host computer 20. However, in the case that the calorimetric values of the measurement patch 51 are corrected in the image forming apparatus 30, the same procedure can be conducted by the use of the calorimetric values of the measurement patch 51 and the reference patches 52 obtained from the calorimetric device 40, the image reading section 35, or the print processing section 37.

In this way, a density unevenness correcting section is provided in a host computer 20 (or an image forming apparatus 30), and the density unevenness correcting section obtains the calorimetric values of measurement patches 51 and reference patches 52 measured by color measurement conducted by a calorimetric device 40 (or the image forming apparatus 30), detects density unevenness based on the calorimetric values of the reference patches 52, and corrects the calorimetric values of the measurement patches 51 based on the density unevenness, whereby even in the case where periodic density unevenness or accidental density unevenness occurs, the influence of density unevenness can be suppressed and then the precision of calibration can be enhanced.

Here, the present invention is not limited to the above-mentioned embodiment. Namely, as long as the calorimetric values of measurement patches 51 can be corrected based on the calorimetric values of reference patches 52 by the use of a patch sheet 50 provided with the measurement patches 51 and the reference patches 52, the above-mentioned embodiment can be changed suitably.

As explained above, according to one exemplary embodiment of the present invention, a patch sheet used for color correction is produced on the basis of data to form measurement patches with respective different densities arranged in a predetermined direction and reference patches with a constant density arranged in the vicinity of the measurement patches for each color toner. Then, density unevenness in the patch sheet is detected based on the calorimetric values of reference patches, the calorimetric values of the measurement patches are corrected based on the density unevenness, and a color correction table is produced based on the corrected calorimetric values.

With this correction table, even in the case where periodic density unevenness or accidental density unevenness occurs, the influence of the density unevenness can be suppressed and the precision of calibration can be enhanced. Furthermore, since it is not necessary to conduct separately detection of density unevenness and color measurement for measurement patches, calibration can be conducted efficiently.

Lastly, the present invention is applicable to systems, methods, and programs which perform calibration using a patch sheet 50.

What is claimed is:

1. A calibration system for conducting calibration by using a patch sheet produced on the basis of data to form measurement patches arranged with respective different densities in a predetermined direction and reference patches arranged with a constant density in the vicinity of the measurement patches for each color toner, comprising:

a correcting section to correct, on the basis of the colorimetric values of the reference patches, the colorimetric values of the measurement patches arranged in the vicinity of the reference patches, wherein the correcting section calculates an amount of density deviation of each of the reference patches on the basis of the colorimetric value of each of the reference patches and an average value of the colorimetric values of all of the reference patches or a preset value, further calculates for a measurement patch arranged in the vicinity of a reference patch having an amount of density deviation exceeding a criterion value an amount of correction based on the amount of density deviation of the reference patch for the colorimetric value of the measurement patch, and corrects the colorimetric value of the measurement patch on the basis of the amount of correction.

2. The calibration system described in claim 1, further comprising:

a host computer to instruct to output the patch sheet;

an image forming apparatus to output the patch sheet; and a colorimetric section to measure the colorimetric value of each of the measurement patches and the colorimetric value of each of the reference patches on the patch sheet;

wherein the host computer comprises the correcting section and a calibrator to produce a color correction table based on the corrected colorimetric values of the measurement patches.

3. The calibration system described in claim 1, further comprising:

an image forming apparatus to output the patch sheet; and a colorimetric section to measure the colorimetric value of each of the measurement patches and the colorimetric value of each of the reference patches on the patch sheet;

wherein the image forming apparatus comprises the correcting section and a calibrator to produce a color correction table based on the corrected colorimetric values of the measurement patches.

4. The calibration system described in claim 1, further comprising:

an image forming apparatus to output the patch sheet;

wherein the image forming apparatus comprises a colorimetric section to measure the colorimetric value of each of the measurement patches and the colorimetric value of each of the reference patches on the patch sheet; the correcting section and a calibrator to produce a color correction table based on the corrected colorimetric values of the measurement patches.

5. The calibration system described in claim 1, further comprising:

an image forming apparatus to form a toner image on the patch sheet;

wherein the image forming apparatus comprises a colorimetric section to measure the colorimetric value of each of the measurement patches and the colorimetric value of each of the reference patches by the use of the toner image on the patch sheet transferred onto an intermediate transfer member; the correcting section and a calibrator to produce a color correction table based on the corrected colorimetric values of the measurement patches.

6. A calibrating method, comprising:

a first step of outputting a patch sheet on the basis of data to form measurement patches arranged with respective different densities in a predetermined direction and reference patches arranged with a constant density in the vicinity of the measurement patches for each color toner;

a second step of measuring a colorimetric value of each of the measurement patches and a colorimetric value of each of the reference patches;

a third step of correcting, on the basis of a colorimetric values of the reference patches, the colorimetric values of the measurement patches arranged in the vicinity of the reference patches; and a fourth step of producing a color correction table on the basis of the corrected colorimetric values of the measurement patches, wherein the third step includes the steps of:

calculating an amount of density deviation of each of the reference patches on the basis of the colorimetric value of each of the reference patches and an average value of the colorimetric values of all of the reference patches or a preset value;

calculating for a measurement patch arranged in the vicinity of a reference patch having an amount of density deviation exceeding a criterion value an amount of correction based on the amount of density deviation of the reference patch for the colorimetric value of the measurement patch; and correcting the colorimetric value of the measurement patch on the basis of the amount of correction.

7. A calibrating method, comprising:

a first step of forming a toner image on a patch sheet on the basis of data to form measurement patches arranged with respective different densities in a predetermined direction and reference patches arranged with a constant density in the vicinity of the measurement patches for each color toner;

a second step of measuring a colorimetric value of each of the measurement patches and a colorimetric value of each of the reference patches by using the toner image on the patch sheet transferred onto an intermediate transfer member;

a third step of correcting, on the basis of the colorimetric values of the reference patches, the colorimetric values of the measurement patches arranged in the vicinity of the reference patches; and a fourth step of producing a color correction table on the basis of the corrected colorimetric values of the measurement patches, wherein the third step includes the steps of:

calculating an amount of density deviation of each of the reference patches on the basis of the colorimetric value of each of the reference patches and an average value of the colorimetric values of all of the reference patches or a preset value;

calculating for a measurement patch arranged in the vicinity of a reference patch having an amount of density deviation exceeding a criterion value an amount of correction based on the amount of density deviation of the reference patch for the colorimetric value of the measurement patch; and correcting the colorimetric value of the measurement patch on the basis of the amount of correction.

8. A non-transitory computer-readable medium storing a correction processing program readable by a computer, wherein the correction processing program is adapted to work in a system for conducting calibration by using a patch sheet produced on the basis of data to form measurement patches arranged with respective different densities in a predetermined direction and reference patches arranged with a constant density in the vicinity of the measurement patches for each color toner, the system comprising as a function of the computer:

a correcting section to correct, on the basis of a colorimetric value of a reference patch among the reference patches, a colorimetric value of a measurement patch arranged in the vicinity of the reference patch, wherein the correcting section calculates an amount of density deviation of each reference patch on the basis of the colorimetric value of each of the reference patches and an average value of the colorimetric values of all of the reference patches or a preset value, further calculates for a measurement patch arranged in the vicinity of a reference patch having an amount of density deviation exceeding a criterion value an amount of correction based on the amount of density deviation of the reference patch for the colorimetric value of the measurement patch, and corrects the colorimetric value of the measurement patch on the basis of the amount of correction.

* * * * *